May 13, 1952      B. L. SCHERER      2,596,606
INVERTER STARTING CIRCUIT
Filed April 19, 1951
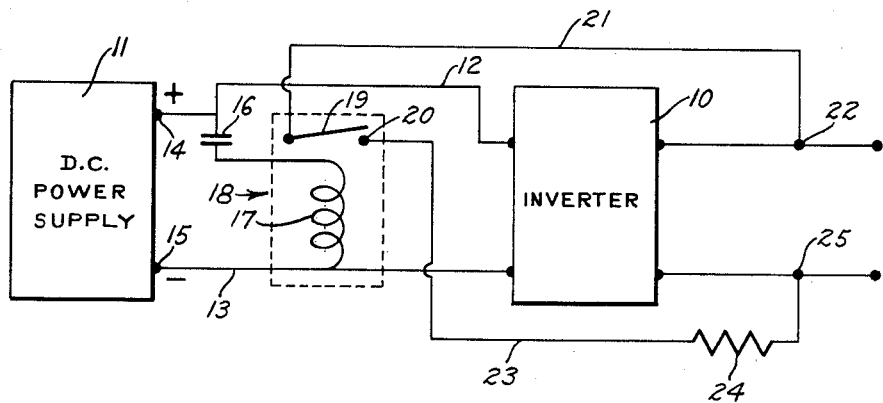
_Fig. 1_
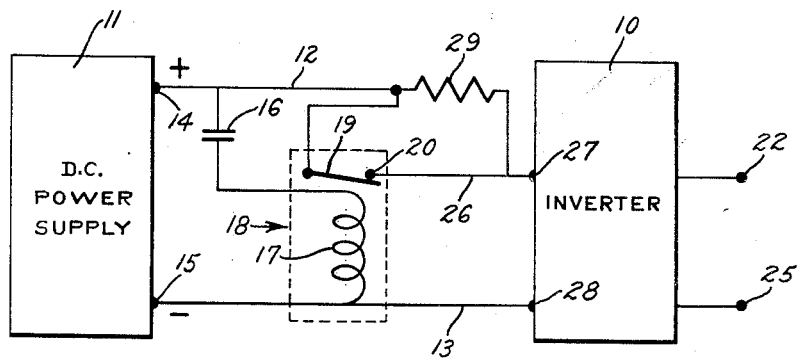
_Fig. 2_
INVENTOR.
BERNARD L. SCHERER
BY
ATTORNEY Patented May 13, 1952

2,596,606

UNITED STATES PATENT OFFICE 2,596,606

INVERTER STARTING CIRCUIT

Bernard L. Scherer, New York, N. Y., assignor to Sorensen & Company, Inc., Stamford, Conn., a corporation of Connecticut Application April 19, 1951, Serial No. 221,810

5 Claims. (Cl. 321—32)

This invention relates to electronic inverters and it relates more particularly to a means for easily starting said electronic inverters at high direct current voltages.

The changing of direct current into alternating current is known as inversion and the electronic tube and its related circuit elements used for this purpose are known as inverters. Vacuum tube oscillators can be used for this function but are used primarily in low-current circuits where sinusoidal waveforms, high frequencies or a combination of both are required.

For high current, dependable and highly efficient power inversion gas-filled tubes having characteristically low internal resistance and practically current arc-drop are ideal. Consequently, most inverters employ either the thyratron type or the mercury arc type tube. Such circuits, however, are relatively difficult to start oscillating at high values of impressed direct current voltage. If the voltage can be reduced for a short period the inverter will start quite readily.

It is therefore an object of the invention to provide a starting circuit which in combination with an electronic inverter will enable said inverter to start easily even when the voltage of the direct current source is relatively high.

It is another object of the invention to provide a starting circuit which will enable an electronic inverter to start readily and where said starting circuit acts to place a temporary load on said inverter, and to remove said load as soon as the inverter begins to operate.

Still another object is to provide a starting circuit for an inverter wherein the direct current voltage to the inverter is momentarily reduced by the insertion of a resistance in series with one of the direct current power leads.

The above and other objects of the invention may be more readily understood from the following detailed description particularly when taken in consideration with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a schematic circuit diagram of one embodiment of the invention; and

Fig. 2 is a schematic circuit diagram of another embodiment of the invention wherein a resistance is inserted in series with a power lead.

As it is agreed that inverters are well known in the art and further, as my starting circuit is not limited to any particular type of electronic inverter, such an inverter is shown in block form in both figures.

Referring now to Fig. 1, an inverter 10 is connected to its source of direct current supply 11 by means of connections 12 and 13. Connection 12 is connected to a positive terminal 14 of the power supply 11 and connection 13 is connected to a negative terminal 15. In a conventional inverter, the other end of connection 12 is connected to the center tap of a plate transformer and negative connection 13 is connected to the cathodes of the inverter tubes.

A capacitor 16 has one terminal connected to the positive terminal 14 of the power supply 11, the other side of capacitor 16 being connected to one end of a winding 17 of an electromagnetic relay 18. The other end of the winding 17 is connected to the negative connection 13. Thus, the capacitor 16 and winding 17 are connected in series across the direct current supply 11.

The electromagnetic relay 18 has a pair of switching contacts including a movable contact 19 and a fixed contact 20. The movable contact 19 is connected by a lead 21 to an output terminal 22 and the fixed contact 20 is connected by a lead 23 through a load resistance 24 to a second output terminal 25.

The functioning of the circuit may be readily understood. Assume the power supply 11 to be turned off and the inverter 10, as a result, non-operating. Then at the instant the power supply 11 is energized a direct current potential appears across the terminals 14 and 15. This potential causes a current to flow from positive terminal 14, through the capacitor 16 and the winding 17 to the negative terminal 15. At the instant the power supply 11 is energized, the entire voltage across the terminals 14 and 15 appears across the winding 17 of the electromagnetic relay 18.

The current flowing through the winding causes a magnetic field to be set up sufficient to close the movable contact 19 and thus place the resistance 24 as a load across the output terminals 22 and 25 of the inverter 10. With the load 24 across the terminals, the inverter 10 is able to start more easily than if such a load were not present. As heretofore mentioned, unloaded inverters are particularly hard to start especially at relatively high direct current voltages.

A short time after the power 11 is energized, the capacitor 16 becomes charged and eventually all of the voltage appears across the capacitor 16, current then ceases to flow and the relay 18 is de-energized. The movable contact 19 will then open and return to its normal position and hence the load resistance 24 is no longer across the output terminals 22 and 25.

An embodiment of the invention which illustrates the principle of momentarily reducing the direct current voltage applied to the inverter is shown in Fig. 2. In this figure, like parts are shown by like numbers and as in the instance of the embodiment of Fig. 1, a capacitor 16 in series with the winding 17 of an electro-magnetic relay 18 is connected across the output terminals 14 and 15 of a source of direct current power 11. The power supply 11 provides the source of power for the inverter 10. In the embodiment of Fig. 2, the movable contact 19 is normally closed against the fixed contact 20 so that normally the positive terminal 14 is connected through lead 12, movable contact 19, fixed contact 20 and lead 26 to an input terminal 27 of the inverter 10. The negative terminal 15 is connected to another input terminal 28 by the connection 13.

A resistance 29 is connected across the movable contact 19 and the fixed contact 20 of the relay 18. Thus, when these contacts are open the positive terminal 14 is connected through lead 12, through the resistance 29 to the input terminal 27. When this resistance 29 is in the circuit there is, of course, a substantial voltage drop across the resistance and the voltage across the input terminals 27 and 28 is reduced to allow the inverter 10 to start easily.

Upon energizing the power supply, all of the voltage across the terminals 14 and 15 appears across the winding 17. The relay is energized and movable contact 19 is drawn away from contact 20 thus putting the resistance 29 in series with the power lead from the positive terminal 14 to the input terminal 27. As stated above, the input voltage across the terminals 27 and 28 is reduced and the inverter 10 starts. A short time later the capacitor 16 is fully charged and current ceases to flow through the winding 17. The relay 18 is then de-energized, contacts 19 and 20 are again closed to short circuit the resistance 29 and to restore the full supply voltage to the input terminals 27 and 28.

In both the circuits of Fig. 1 and Fig. 2, the length of time the relay 18 is operative is dependent upon the value of the capacitor and the direct current resistance of the winding 17. The longer the time constant of the circuit the longer it will take the capacitor 16 to charge and hence the longer the relay 18 will be operative. As it is thus very easy to vary the time constant, a time interval sufficient to allow the inverter to start can readily be provided.

Having thus set forth the nature of my invention, what I claim is:

1. In combination with an electronic inverter being supplied from a source of direct current potential, means for readily starting said inverter by momentarily reducing the magnitude of said direct current potential, said means including switching means adapted to be operative upon the surge of current which occurs when said source of potential is energized and rendered non-operative when said surge has passed, resistance means associated with said switching means whereby when said switching means is operative said resistance means loads said source of direct current potential to reduce the magnitude of the potential supplied the inverter to enable said inverter to start readily.

2. In combination with an electronic inverter being supplied from a source of direct current potential, means for readily starting said inverter by a temporary load, said means including switching means adapted to be operative upon the surge of current which occurs when said source of potential is energized and rendered non-operative when said surge has passed, resistance means associated with said switching means whereby when said switching means is operative said resistance means serves as a load for said inverter to enable said inverter to start readily.

3. In combination with an electronic inverter being supplied from a source of direct current potential, means for readily starting said inverter by temporarily loading said inverter, said means including an electro-magnetic relay having a winding and a pair of contacts, a capacitor serially connected with said winding, the series combination of said winding and said capacitor being connected across the source of direct current potential, a temporary load for said inverter, an electrical connection of said temporary load and said contacts whereby when said source of direct current potential is energized current flows through said capacitor and said winding to operate said relay and place said temporary load across the inverter to enable said inverter to start readily and further whereby when said capacitor is fully charged the relay is de-energized and the temporary load is removed.

4. In combination with an electronic inverter supplied from a source of direct current potential, means for readily starting said inverter by temporarily loading said inverter, said means including an electro-magnetic relay having a winding and a pair of contacts, said contacts being open when said relay is non-energized and closed when energized, a capacitor serially connected with said winding, the series combination of said winding and said capacitor being connected across the source of direct current potential, and a temporary load for said inverter, said load being connected in series with said pair of contacts whereby when said source of direct current potential is energized current flows through said capacitor and said winding to operate said relay and close said contacts to put said temporary load across said circuit to enable said inverter to start readily and whereby when said capacitor is fully charged current ceases to flow, the relay is de-energized and said contacts open to remove said temporary load.

5. In combination with an electronic inverter supplied from a source of direct current potential, means for readily starting said inverter by momentarily reducing the magnitude of said potential, said means including an electro-magnetic relay having a winding and a pair of contacts, said contacts being closed when said relay is non-energized and open when energized, a capacitor serially connected with said winding, the series combination of said winding and said capacitor being connected across the source of direct current potential, and a resistance serially connected between said source of potential and the inverter being supplied therefrom, said resistance being normally short circuited by being also connected directly across said normally closed contacts whereby when said source of direct current potential is energized current flows through said capacitor and said winding to operate said relay and to open said contacts to remove said short circuit from said resistance and thereby lower the direct current potential applied to said inverter and whereby when said capacitor is fully charged current ceases to flow, the relay is de-energized and said contacts close to short circuit said resistance.

BERNARD L. SCHERER.

REFERENCES CITED

The following references are of record in the file of this patent:

UNITED STATES PATENTS

| Number | Name | Date |
|---|---|---|
| 1,759,745 | Grimditch | May 20, 1930 |
| 1,760,580 | Brown | May 27, 1930 |